(12) United States Patent
Wieczorek

(10) Patent No.: US 11,106,035 B2
(45) Date of Patent: *Aug. 31, 2021

(54) VIRTUAL REALITY DEVICES AND ACCESSORIES

(71) Applicant: Mark D. Wieczorek, San Diego, CA (US)

(72) Inventor: Mark D. Wieczorek, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/215,375

(22) Filed: Mar. 29, 2021

(65) Prior Publication Data
US 2021/0215933 A1 Jul. 15, 2021

Related U.S. Application Data

(63) Continuation of application No. 17/094,460, filed on Nov. 10, 2020, now Pat. No. 10,965,784, which is a
(Continued)

(51) Int. Cl.
*G02B 27/01* (2006.01)
*A63F 13/00* (2014.01)
(Continued)

(52) U.S. Cl.
CPC .......... *G02B 27/017* (2013.01); *A63F 13/00* (2013.01); *A63F 13/26* (2014.09); *G06F 3/011* (2013.01); *G06F 3/0383* (2013.01); *G06F 3/04842* (2013.01); *G06F 3/167* (2013.01); *G06T 11/60* (2013.01); *H04L 67/38* (2013.01);

*A63F 2300/8082* (2013.01); *G02B 2027/0138* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 5,872,438 | A | 2/1999 | Roston |
| 6,695,770 | B1 | 2/2004 | Choy |

(Continued)

OTHER PUBLICATIONS

Loral; "Tip of the Week-Raiding in EverQuest—Jul. 3, 2007"; Jul. 3, 2007; all pages; https://www.everquest.com/news/imported-eq-enus-50487.

(Continued)

*Primary Examiner* — Peter Hoang
(74) *Attorney, Agent, or Firm* — Mayer & Williams, PC

(57) ABSTRACT

Systems and methods disclosed provided a virtual reality experience, including: a set of motorized pads for coupling to feet of a user; a means of communication between the set of motorized pads and a computing environment operating a virtual reality headset; such that the set of motorized pads are configured to provide pressure on a user's feet as an avatar within a virtual environment traverses the environment. Systems and methods disclosed further provide a multiuser virtual reality experience. Systems and methods disclosed further provide a multiuser experience including generation of a common environment viewable in the virtual reality headsets; and recording a tour including audio data as the first user describes the common environment.

26 Claims, 4 Drawing Sheets

Related U.S. Application Data continuation of application No. 17/094,428, filed on Nov. 10, 2020, now Pat. No. 10,921,591, which is a continuation of application No. 17/086,909, filed on Nov. 2, 2020, now Pat. No. 10,921,590, which is a continuation of application No. 16/945,765, filed on Jul. 31, 2020, now Pat. No. 10,921,589, which is a continuation of application No. 15/931,958, filed on May 14, 2020, now Pat. No. 10,761,325, which is a continuation of application No. 16/785,970, filed on Feb. 10, 2020, now Pat. No. 10,690,913, which is a continuation of application No. 16/382,448, filed on Apr. 12, 2019, now Pat. No. 10,558,042, which is a continuation of application No. 14/669,744, filed on Mar. 26, 2015, now Pat. No. 10,725,298.

(60) Provisional application No. 61/970,512, filed on Mar. 26, 2014.

(51) Int. Cl.
*A63F 13/26* (2014.01)
*G06F 3/01* (2006.01)
*G06F 3/038* (2013.01)
*G06F 3/0484* (2013.01)
*G06F 3/16* (2006.01)
*G06T 11/60* (2006.01)
*H04L 29/06* (2006.01)

(56) References Cited

U.S. PATENT DOCUMENTS

| | | |
|---|---|---|
| 2005/0116954 A1 | 6/2005 | Ripps |
| 2006/0015560 A1 | 1/2006 | MacAuley |
| 2006/0262120 A1 | 11/2006 | Rosenberg |
| 2007/0186007 A1 | 8/2007 | Field |
| 2008/0081701 A1 | 4/2008 | Shuster |
| 2008/0294663 A1 | 11/2008 | Heinley |
| 2009/0063156 A1 | 3/2009 | Squedin |
| 2011/0082009 A1 | 4/2011 | Ranky |
| 2012/0226987 A1 | 9/2012 | Wie |
| 2013/0271457 A1 | 10/2013 | Haswell |
| 2014/0009490 A1 | 1/2014 | Gärdenfors |
| 2014/0046829 A1 | 2/2014 | Serban |
| 2014/0063061 A1 | 3/2014 | Reitan |
| 2014/0114845 A1* | 4/2014 | Rogers ............... G06Q 20/145 705/39 |
| 2014/0306866 A1 | 10/2014 | Miller |
| 2015/0002541 A1* | 1/2015 | Dillavou ............... G06F 3/011 345/633 |
| 2016/0035140 A1 | 2/2016 | Bickerstaff |
| 2016/0093108 A1 | 3/2016 | Mao |
| 2018/0330549 A1 | 11/2018 | Brenton |

OTHER PUBLICATIONS

Information on Leap Motion, Inc., download Apr. 23, 2021 from Wikipedia at https://en.wikipedia.org/wiki/Leap_Motion (author unknown).

* cited by examiner

VIRTUAL REALITY DEVICES AND ACCESSORIES

CROSS-REFERENCE TO RELATED APPLICATIONS

This application is a continuation of U.S. application Ser. No. 17/094,460, filed Nov. 10, 2020, which is a continuation of U.S. Ser. No. 17/094,428, filed Nov. 10, 2020, which is a continuation of U.S. Ser. No. 17/086,909, filed Nov. 2, 2020, which is a continuation of U.S. application Ser. No. 16/945,765, filed Jul. 31, 2020, which is a continuation of U.S. application Ser. No. 15/931,958, filed May 14, 2020, which is a continuation of U.S. application Ser. No. 16/785,970, filed Feb. 10, 2020, which is a continuation of U.S. application Ser. No. 16/382,448, filed Apr. 12, 2019 (now U.S. Pat. No. 10,558,042, issued Feb. 11, 2020), which is a continuation of U.S. patent application Ser. No. 14/669,744, filed Mar. 26, 2015 which claims the benefit of priority of U.S. Provisional Patent Application Ser. No. 61/970,512, filed Mar. 26, 2014, entitled "VIRTUAL REALITY DEVICES AND ACCESSORIES", owned by the owner of the present application and herein incorporated by reference in its entirety.

BACKGROUND

Virtual Reality (VR) headsets, such as the Oculus Rift®, are poised to become a significant new factor in computer environments, including gaming, virtual tourism, and the like. However, the same also present a number of challenges. Consequently, there is a need for improvements in VR headsets and accessories.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The above needs are met in various ways by systems and methods according to present principles.

In one aspect, the invention is directed towards a system for providing a virtual reality experience, including: a set of motorized pads for coupling to respective feet of a user; a means of communication between the set of motorized pads and a computing environment operating a virtual reality headset; such that the set of motorized pads are configured to provide pressure on a user's feet as an avatar within a virtual environment traverses the environment.

Implementations of the invention include one or more of the following. The means of communication may be an RF link or a wired link. The avatar may be a player character in a videogame or a character in a virtual tour. The set of motorized pads may include a left pad and a right pad, corresponding to a user's left foot and right foot, and the set of motorized pads may be configured to provide pressure on the user's left foot as an avatar within the virtual environment steps down on the environment with their left foot, and where the motorized pads may further be configured to provide pressure on the user's right foot as an avatar within the virtual environment steps down on the environment with their right foot.

In another aspect, the invention is directed towards a method of providing a multiuser virtual reality experience, including: configuring a server to communicate with a first user computing environment, the first user computing environment coupled to a first virtual reality headset, the first user computing environment configured to generate a first avatar corresponding to the user, the first avatar situated within a common environment viewable in the first virtual reality headset; and configuring a server to communicate with a second user computing environment, the second user computing environment coupled to a second virtual reality headset, the second user computing environment configured to generate a second avatar corresponding to the user, the second avatar situated within the common environment viewable in the second virtual reality headset.

Implementations of the invention may include one or more of the following. The method may further include configuring the server to allow the first user to provide a tour to the second user. The configuring the server to allow the first user to provide a tour to the second user may include configuring the server to cause the second avatar to automatically follow the first avatar as the first avatar moves within the common environment. The server may be a social networking server. For example, where the server is a server of a social networking site, the same may allow the first user to indicate entries on a social networking page corresponding to the first user, and to provide audio commentary before, during, or after, the indication. The tour and the audio commentary may be recorded for later playback. The indication of entries may be via the first avatar pointing at an asset corresponding to the entry. The entries may include textual entries, audio entries, photographic entries, or video entries. The method may further include receiving an asset from a third-party source distinct from the social networking page corresponding to the first user, and configuring the server to allow the tour to include the received asset.

In another aspect, the invention is directed towards a non-transitory computer readable medium, including instructions for causing a computing environment to perform the above method.

In another aspect, the invention is directed towards a method of providing a multiuser virtual reality experience, including: configuring a server to communicate with a first user computing environment, the first user computing environment coupled to a first virtual reality headset, the first user computing environment configured to generate a common environment viewable in the first virtual reality headset; and recording a tour including audio data as the first user describes the common environment.

Implementations of the invention may include one or more of the following. The server may be a server of a social networking site, and the common environment may include visual depictions of entries from a social networking page corresponding to the first user, and the method may further include configuring the server to allow the first user to indicate the entries and to provide audio commentary before, during, or after, the indication.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

VR headsets, while providing high degrees of immersion, can also be very disorienting to a user. Accordingly, it can be helpful to users to have player character (PC) avatars move at a slow rate through the online environment. If a game or online environment is designed for VR, then the PC speed within the environment can be designed to be slow or below a predetermined threshold, e.g., less than 5 mph or 10 mph as measured within the online environment. If the game environment or game application is being retrofitted for VR, then the PC speed can be slowed down to the levels described.

Another disorienting aspect is that one typically games or performs virtual tourism while sitting down, while the PC is walking around within the online environment. This can be disorienting too, if for no other reason than the height differential between standing and sitting.

Figure 1:
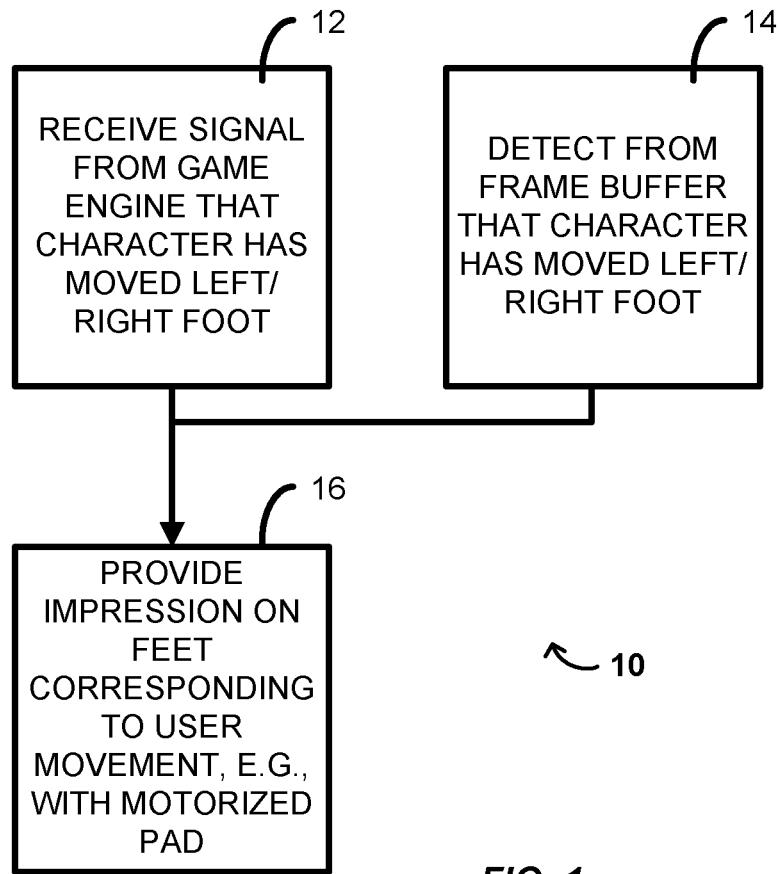
FIG. 1 is a flowchart of a method according to present principles.
Figure 2:
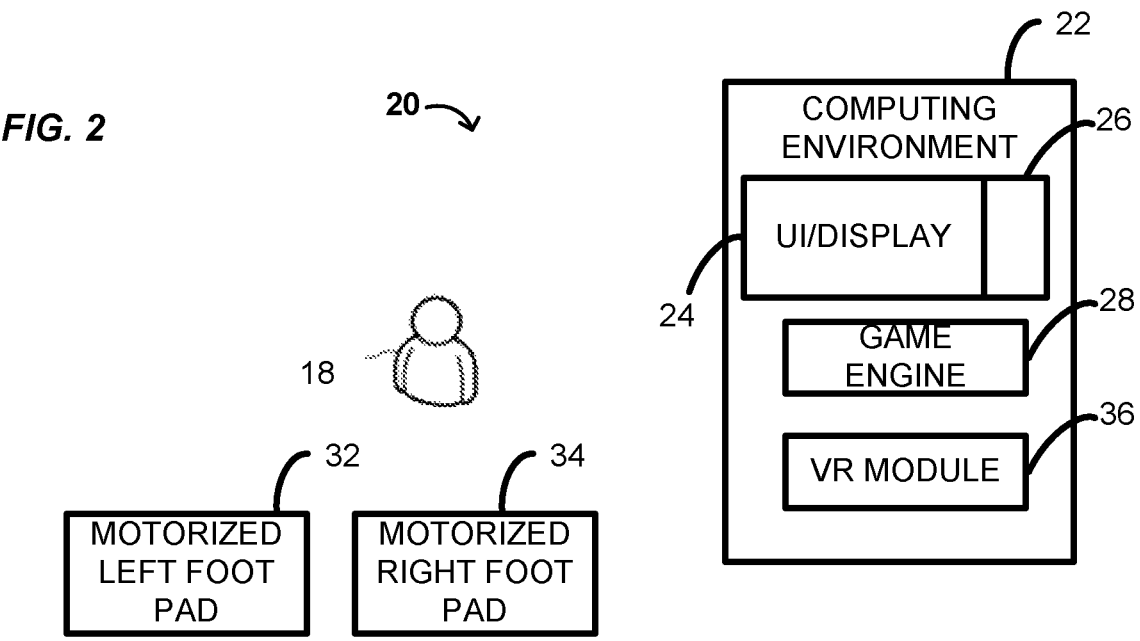
FIG. 2 is a schematic illustration of a system according to present principles.

Various solutions are available. In one implementation, and referring to the flowchart 10 of FIG. 1 and the schematic diagram of the system 20 of FIG. 2, motorized pads 32 and 34 may be placed on the feet of a user 18 and interfaced with the game engine 28 running on a computing environment 22. Alternatively, a frame buffer 26 may read the display 24 and estimate when character appendages (responsible for movement) are striking a surface. The estimation may be performed by a VR module 36 running on the computing environment, or alternatively the VR module may run within a VR headset. When the user walks through the environment, the motorized pads sequentially push up on the pads of the feet of the wearer. The interfacing may be, but is not limited to be, such that when the PC's left foot makes a step in the online environment, the left motorized pad is activated. When the PC's right foot makes a step, the right motorized pad is activated. Speed changes may be recognized, as can force with which a foot strikes the surface, e.g., whether the user is walking delicately or running hard. Standing in place can be simulated by relatively constant pressure on each foot (leaning may also be accommodated). The motorized pads may be conveniently disposed on a surface on which a user rest their feet, or within footwear.

In one method, a signal may be received from the game engine that a character is moving (step 12), and in some cases the signal may even indicate whether a left foot or right foot is currently moving. In some cases the movement, and/or a particular appendage moving, may be detected using a frame buffer analyzing the display (step 14). A VR module, or other input/output module within the game, may then provide an impression on the feet of the user corresponding to the movement of the player character within the game or other virtual environment (step 16). Such an impression may be performed using, e.g., a motorized pad.

It is noted that the accuracy of the motorized pads need not be perfect. So long as the user generally feels forces against their feet, the immersion may be maintained.

Figure 3:
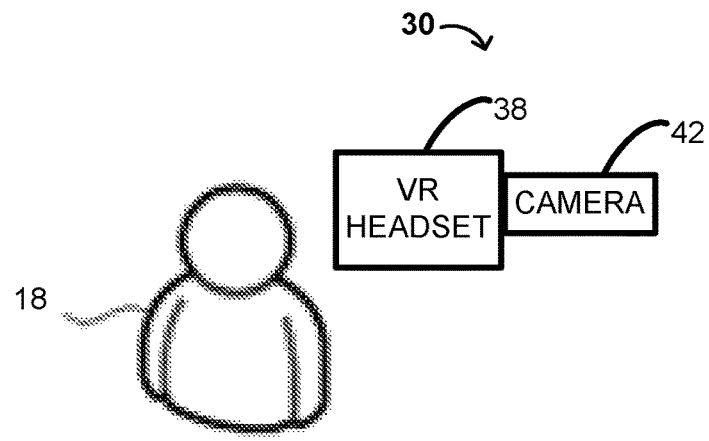
FIG. 3 is another schematic illustration of a system according to present principles.

Another disorienting factor comes from the lack of vision outside of the VR headset, and in particular the aspect that if a user moves their hands up in front of their face, they do not see their hands. While several hand and body sensors exist and can be used to detect when hands should be rendered, such as generally complicated and too expensive for most users. Accordingly, in a system 30 illustrated in FIG. 3, a simple low resolution camera 42, mounted on the VR headset 38, may be employed to detect the approximate position of the user's hands and feed the same into the game engine to allow for the rendering of "approximate" versions of the user's hands.

Various benefits inure to such systems. First, the system may scale to higher resolutions as cameras become higher resolution, cheaper, and lighter (weight is an important factor for inclusion onto a headset). Camera position on a headset is convenient for visualization as there is unity in that what the camera sees is the same as what the user would expect to view from their eye position within the headset.

Figure 4:
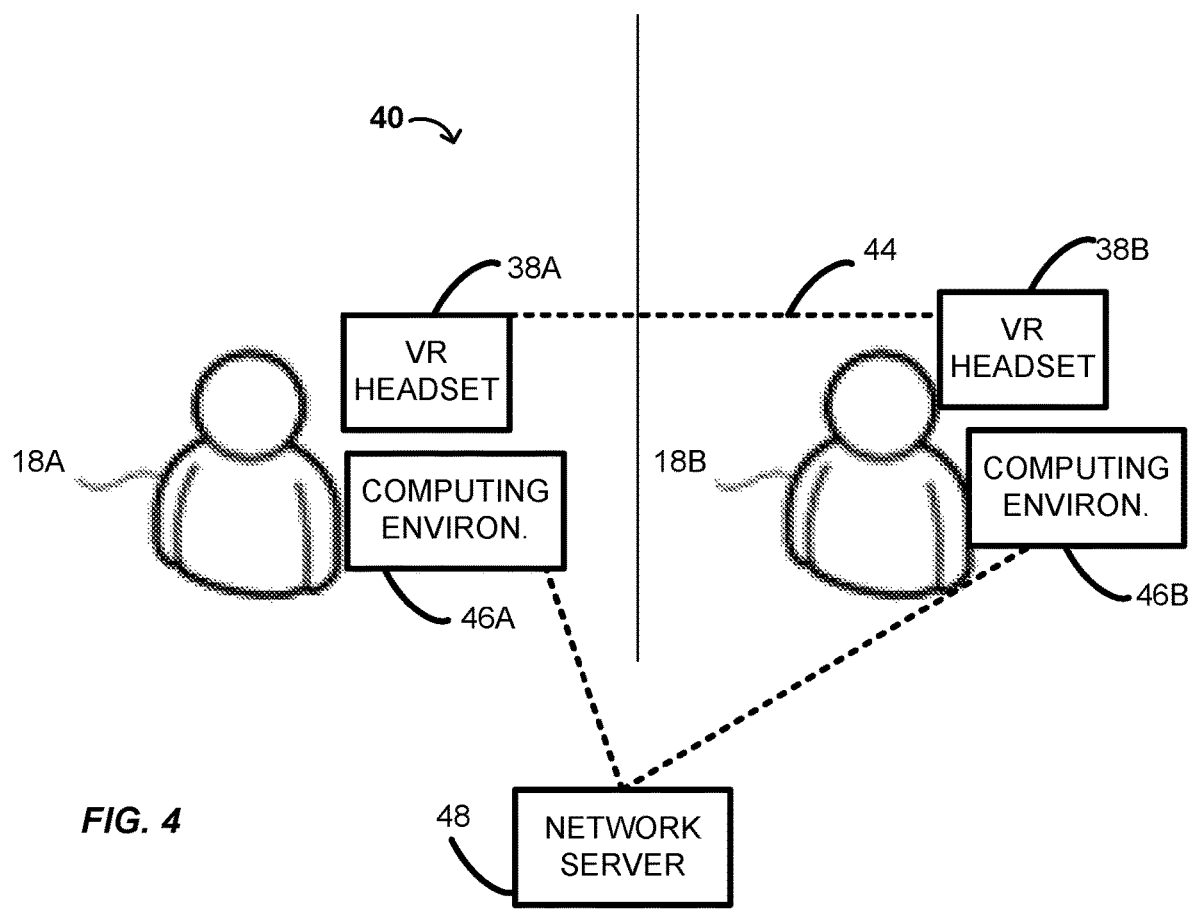
FIG. 4 is another schematic illustration of a system according to present principles.

Another important application concerns multiplayer uses. In particular, and referring in particular to the system 40 depicted in FIG. 4, two users 18A and 18B may each have a respective VR headset 38A and 38B and may be in data communication with each other via a communications link 44, e.g., over the Internet, Bluetooth, LAN, WLAN, cellular communications, NFC, or any other sort of communications technology existing now or developed later. The client application on each person's system, e.g., computing environments 46A and 46B, respectively, which control operations on VR headsets 38A and 38B, may be a thin client or a substantial one. It is noted here that the headsets 38A and 38B may also be embodied by augmented reality (AR) headsets as well. In addition, the headsets may well incorporate all the computing functionality needed to perform the applications described here; this may be particularly true as processor power continues to increase along with miniaturization. The systems and methods according to present principles may work well with both types of systems.

Alternatively, the client systems may communicate via a web application or a hybrid system where one user employs a standalone client and another a web application. The web application or standalone client may form a portion of a network such as a social network where communications occur over one or more network servers 48. For example, a Facebook® application may employ VR headsets and users may be thereby enabled to communicate with each other. In this system, where previously members would communicate with each other via Facebook video or voice chatting, a VR communication application may advantageously take advantage of the virtual reality SDK, e.g., Oculus Rift® SDK, to perform similar functionality.

However, in systems and methods according to current principles, users may go far beyond just seeing each other. For example, each user may have associated therewith an avatar, and various levels of avatar customization can be allowed. In some cases, a selection of hair lengths, hair colors, facial shapes, skin colors, body types, heights, eye colors, and the like, may be employed to allow customization of an avatar. In more advanced implementations, users may be permitted to submit photographs of their head or their entire body to allow a three-dimensional reconstruction of the same to be created and employed in the simulation.

In a particular implementation of a VR simulation within a social network, a "page tour" functionality is enabled where users can give tours of their social networking page to a friend or other reviewer. Users may even record (within the application) a video of such tours, so that others may be enabled to view the recorded tour at their convenience. In a page tour, a first user leads a second user on a tour of the events chronicled on the first user's social networking page. For example, the users may appear to walk down a timeline, with various pictures at respective various locations in time. The first user may point out aspects of the photos or videos to the second user, and one or both users may "teleport" to other pages by following links on the first user's social networking page. For example, if in the past the first user "checked in" at the Eiffel Tower in France, and the first user was giving a tour including that check in to a second user, the first user (or the second user) may click on a link to view a third-party three-dimensional reconstruction of the Eiffel Tower, so as to allow the first user to give a tour of the Eiffel Tower to the second.

In the same way, the first user may "teleport" to a relative's page to point out various family members or the like.

Other variations will also be understood. For example, the background of the virtual reality seen may not be just "black" or static. For example, if the first user is giving a tour of friends to a second user, French scenes may provide a backdrop, and French music may be played as an audio file.

Figure 5:
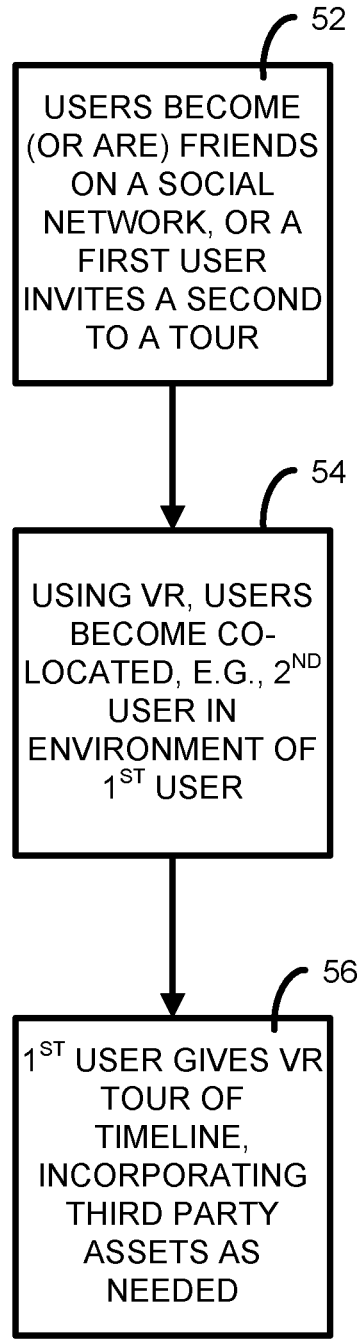
FIG. 5 is another flowchart of a method according to present principles.

In a general implementation, as shown in the flowchart 50 of FIG. 5, a first step is that users become (or already are) friends on a social network, or are otherwise associated within a network, such that a second user is allowed to view aspects and personal information of the first user (step 52). Alternatively, a first user may invite the second user to a tour.

Using virtual reality or augmented reality, the users become co-located (step 54), such that each can see the other, e.g., via the avatars described above, or in other ways. The first user then commences to give a virtual reality tour of the assets available to them, e.g., on a Facebook timeline (step 56). As noted, third-party assets may be incorporated if desired, e.g., to give a virtual tour of the Eiffel tower.

The tour may be in real-time, with both users using virtual reality headsets at the same time, or the first user may record their tour for playback in virtual reality to one or more other users at a later time. For example, such may afford the opportunity for a first user to record a life tour for playback to relatives, friends, and loved ones, e.g., as part of a genealogical history or autobiography. The same may be used in hospice situations to record a life history. The same may also form part of an ongoing VR journal.

Figure 6:
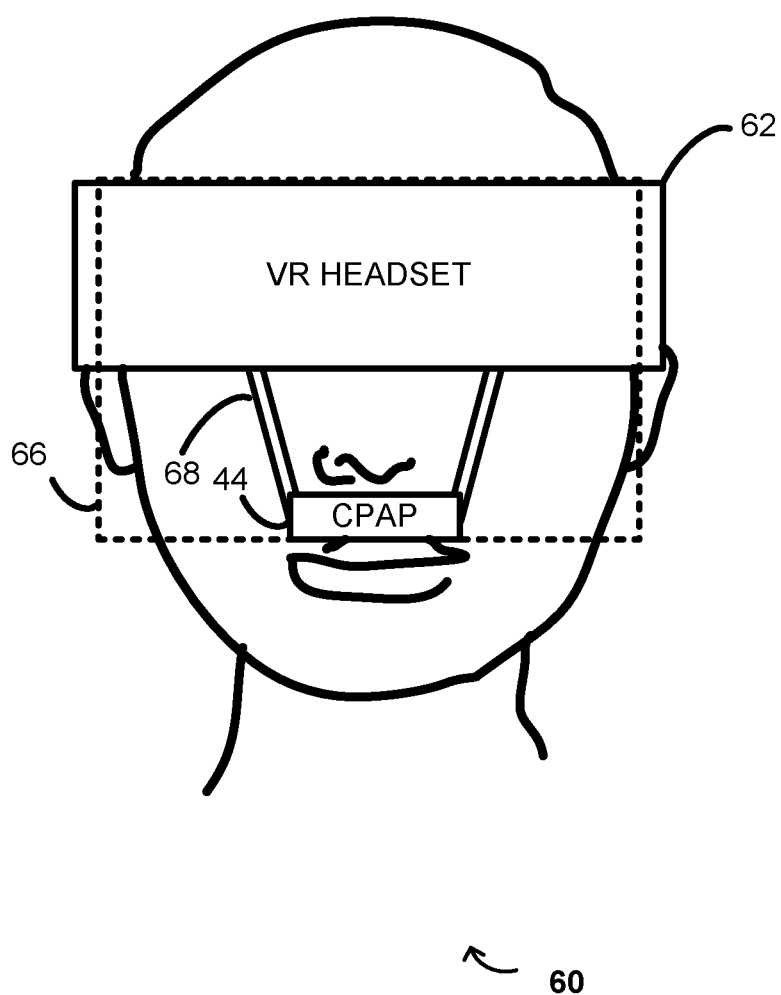
FIG. 6 is another schematic illustration of a system according to present principles.

Other variations will also be understood. For example, and referring to the system 60 of FIG. 6, the immersive headsets described above may advantageously be combined with CPAP machines. In particular, CPAP machines are known to have a low degree of patient compliance because of their uncomfortable character. However, if the VR headset is made large enough, e.g., to envelop the user's nose, as illustrated in the implementation 66, an oxygen supply can be directed through nozzles into the user's nose, performing a positive pressure process, and accomplishing the goals of prior CPAP machines. Alternatively, nozzles 44 may be coupled to the headset 62 but located exterior thereof, e.g., below the headset via pressure hoses 68, so as to allow engagement or positioning adjacent the nasal canal of a user. In use, the same method is performed, with the nozzles directing a positive flow of air or oxygen into the nose of the patient, allowing positive pressure, and accomplishing the goal of prior CPAP machines.

Other variations will also be understood. For example, while VR devices have been disclosed, systems and methods according to present principles may also be implemented within the context of AR devices.

In addition, it is noted that systems and methods according to present principles can generally not be performed without an appropriate computing environment configured to perform the steps disclosed here. In addition, by performing the steps as described, the computing environment is able to operate in a more efficient manner than virtual reality or augmented reality systems of the prior art.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where movements and actions within a virtual reality environment are contemplated, the plural inputs may allow plural users to input relevant data at the same time.

What is claimed is:

1. A non-transitory computer-readable medium, comprising instructions for causing one or more network servers to perform a method of operating a virtual reality environment, the method comprising:
   establishing communications between one or more network servers and a first user computing environment, the first user computing environment coupled to a first virtual reality headset, the first virtual reality headset having a first virtual reality display, the first user computing environment further in communication with a camera, the camera imaging at least user hand position data;
   establishing communications between the one or more network servers and a second user computing environment, the second user computing environment coupled to a second virtual reality headset, the second virtual reality headset having a second virtual reality display;
   operating the one or more network servers using input from the first and second user computing environments to cause a display of a common environment in the first and second virtual reality displays;
   operating the one or more network servers using input from the first user computing environment to cause a display of virtual user hands in the common environment displayed in the first and second virtual reality displays; and
   based on data from a memory in the one or more network servers, the data associated with a social networking account, causing a display of a first asset in the first virtual reality display or in the common environment displayed in the first virtual reality display.

2. The medium of claim 1, wherein:
   the data is based on an entry associated with a social networking page associated with the social networking account, or
   the data is based on an entry associated with a social networking page associated with the social networking account wherein the entry corresponds to a check in or a post on the social networking page associated with the social networking account.

3. The medium of claim 1, wherein the method further comprises:
   receiving input from a pointing device associated with the first user computing environment, the receiving input allowing a user to point at and select a different asset, the different asset displayed in the first virtual reality display or in the common environment displayed in the first virtual reality display, or
   receiving input from a pointing device associated with the first user computing environment, the receiving input allowing a user to point at and select a different asset, the different asset displayed in the first virtual reality display or in the common environment displayed in the first virtual reality display, and causing a display of another asset when a link associated with the different asset is activated, the another asset displayed in the first virtual reality display, in the second virtual reality display, in both the first and second virtual reality displays, in the common environment displayed in the first and second virtual reality displays, or in a combination of the above.

4. The medium of claim 1, wherein the method further comprises:
   operating the one or more network servers to cause a display of a first avatar in the first virtual reality display or in the common environment; and
   receiving input from the first user computing environment customizing the first avatar, customizing at least one of avatar hair color, hair shape, face shape, or body shape; or
   receiving input from the first user computing environment of a computer-generated head or body, and using the input of the computer-generated head or body to generate a portion of the first avatar.

5. The medium of claim 1, wherein the first user computing environment is integrated in the first virtual reality headset.

6. The medium of claim 1, wherein the camera is disposed on or as part of the first virtual reality headset.

7. The medium of claim 1, wherein the method further comprises:
   operating the one or more network servers to cause a display of a second avatar in the common environment, the second avatar associated with the second user computing environment, or
   wherein the method further comprises operating the one or more network servers to cause a display of a second avatar in the common environment, the second avatar associated with the second user computing environment, and providing a follow functionality to allow the second avatar to automatically follow the first avatar as the first avatar moves in the common environment.

8. The medium of claim 1, wherein the common environment has a backdrop or a background scene, and wherein the method further comprises:
   providing an invitation functionality, such that a first user can invite another user to the common environment, the another user associated with another virtual reality headset having another virtual reality display and associated with another user computing environment, and displaying the common environment with the backdrop or background scene in the another virtual reality display if the another user accepts the invitation; and
   receiving input from a pointing device coupled to the first user computing environment or the another user computing environment, the receiving input allowing the first or another user to point at and select a first asset displayed in the respective first virtual reality display or in the another virtual reality display, or in the common environment displayed in the respective first and another virtual reality displays, or in a combination of the above, and based on the receiving input from the pointing device, causing a display of a teleport common environment associated with the first asset, the teleport common environment displayed in the first and another virtual reality displays, the teleport common environment having a different backdrop or background scene than the common environment.

9. A virtual reality headset, comprising:
   a first virtual reality display, the first virtual reality display configured to be coupled to a first user computing environment;
   a non-transitory computer-readable medium, comprising instructions for causing the first user computing environment to:
      receive, from one or more network servers, data about a common environment;
      display a view of the common environment in the first virtual reality display;
      receive, from the one or more network servers, data associated with a different virtual reality headset that is also displaying a respective view of the common environment in a different virtual reality display;

receive, from a memory in the one or more network servers, data based on a social networking account; and based on the received data from the memory in the one or more network servers, cause a display of a first asset in the first virtual reality display or in the common environment displayed in the first virtual reality display;

a camera associated with the first user computing environment, the camera imaging at least user hand position data, and wherein the instructions further cause the first user computing environment to use data from the camera to display virtual user hands in the first virtual reality display or in the common environment displayed in the first virtual reality display; and wherein the view of the common environment is displayed in the first virtual reality display at substantially the same time as the respective view of the common environment is displayed in the different virtual reality display associated with the different virtual reality headset.

10. The headset of claim 9, wherein the first user computing environment is integrated in the virtual reality headset.

11. The headset of claim 9, wherein the camera is disposed on or as part of the virtual reality headset.

12. The headset of claim 9, wherein the instructions further cause a display of an avatar within the common environment, and wherein the first user computing environment, or the one or more network servers, or both the first user computing environment and the one or more network servers, are further configured to:

receive input from the first user computing environment customizing the first avatar, the input customizing at least one of avatar hair color, hair shape, face shape, or body shape; or receive input from the first user computing environment of a computer-generated head or body, and use the input of the computer-generated head or body to generate a portion of the first avatar.

13. The headset of claim 9, wherein:

the first asset is from or is associated with a social networking page associated with the social networking account, or the first asset is from or associated with a social networking page associated with the social networking account, and wherein the first asset is further associated with an entry associated with a social networking page associated with the social networking account, and wherein the instructions further cause the entry to be displayed as part of a display of the social networking page.

14. The headset of claim 9, wherein the instructions further cause the first user computing environment to receive input from a pointing device, the received input allowing a user to point at and select a second asset, the second asset displayed in the first virtual reality display or in the common environment displayed in the first virtual reality display.

15. The headset of claim 9, wherein the common environment includes a backdrop or a background scene, and wherein the non-transitory computer-readable medium further comprises instructions for causing the first user computing environment to:

receive, from the one or more network servers, data associated with a second virtual reality headset having a second virtual reality display and associated with a second user computing environment;

indicate that an invitation is to be sent to the second user computing environment, wherein the common environment is caused to be displayed in a respective view in the second virtual reality display if the invitation is accepted; and receive input from a pointing device coupled to the first user computing environment, the received input allowing a user to point at and select a first asset displayed in the first virtual reality display or in the common environment displayed in the first virtual reality display, and based on the received input from the pointing device, cause a display of a teleport common environment associated with the first asset, the teleport common environment displayed in the first and second virtual reality displays, the teleport common environment having a different backdrop or background scene than the common environment.

16. A non-transitory computer-readable medium, comprising instructions for causing a first user computing environment to perform a method, comprising:

displaying a common environment in a first virtual reality display within a first virtual reality headset;

receiving input from a camera, the camera imaging first user hand position data, and displaying virtual user hands in the first virtual reality display or in the common environment displayed in the first virtual reality display, the displaying virtual user hands based on the first user hand position data from the camera;

communicating with one or more network servers, the one or more network servers further communicating with a plurality of other user computing environments, wherein at least some of the other user computing environments are coupled to respective virtual reality displays, and wherein at least some of the other user computing environments are configured to display respective views of the common environment in the respective virtual reality displays; and causing a display of an asset in the first virtual reality display or in the common environment displayed in the first virtual reality display, the asset selected based on data communicated from a memory in the one or more servers, the data associated with a social networking account.

17. The medium of claim 16, wherein the camera is disposed on or as part of the first virtual reality headset.

18. The medium of claim 16, wherein the first user computing environment is integrated in the first virtual reality headset.

19. The medium of claim 16, wherein:

the displayed asset is associated with an entry associated with a social networking page associated with the social networking account, or the displayed asset is associated with an entry associated with a social networking page associated with the social networking account, and wherein the method further comprises displaying the entry associated with the social networking page as part of a display of the social networking page within the common environment.

20. The medium of claim 16, wherein the method further comprises displaying an avatar within the common environment, and further comprises:

receiving input from the first user computing environment customizing the first avatar, customizing at least one of avatar hair color, hair shape, face shape, or body shape; or receiving input from the first user computing environment of a computer-generated head or body, and using the input of the computer-generated head or body to generate a portion of the first avatar.

21. The medium of claim 16, wherein the common environment includes a backdrop or a background scene, and wherein the method further comprises:

communicating with the one or more network servers, the one or more network servers further communicating with a second user computing environment, the second user computing environment associated with a second virtual reality headset, the second virtual reality headset having a second virtual reality display;

indicating that an invitation is to be sent to the second user computing environment, wherein a respective view of the common environment is caused to be displayed in the second virtual reality display if the invitation is accepted, and wherein the view of the common environment is displayed in the first virtual reality display at substantially the same time as the respective view of the common environment is displayed in the second virtual reality display; and receiving input from a pointing device coupled to the first user computing environment, the receiving input allowing a user to point at and select a first asset displayed in the first virtual reality display or in the common environment displayed in the first virtual reality display, and based on the receiving input from the pointing device, causing a display of a teleport common environment associated with the first asset, the teleport common environment displayed in the first and second virtual reality displays, the teleport common environment having a different backdrop or background scene than the common environment.

22. A virtual reality headset system, comprising:
a first virtual reality headset;
a first virtual reality display within the first virtual reality headset, the first virtual reality display configured to be coupled to a first user computing environment; and
a non-transitory computer-readable medium associated with the first user computing environment, comprising instructions for causing the first user computing environment to:
establish communications with one or more network servers;
display a view of a common environment in the first virtual reality display;
from the one or more network servers, receive and display an indicator of data associated with a different user computing environment; and
receive, from a memory in the one or more network servers, data associated with or based on a social networking account, and based on the data from the memory in the one or more network servers, cause a display of an asset in the first virtual reality display or in the common environment displayed in the first virtual reality display;
wherein the first user computing environment is coupled to a camera and a pointing device, the camera imaging at least user hand position data, and wherein the instructions further cause the first user computing environment to use data from the camera to display an indication of virtual user hands in the first virtual reality display or in the common environment displayed in the first virtual reality display, and wherein the instructions further cause the first user computing environment to use data from the pointing device to allow a first user to point at and select an asset in the first virtual reality display or in the common environment displayed in the first virtual reality display; and
wherein the view of the common environment is displayed in the first virtual reality display at substantially the same time as a respective view of the common environment is displayed in a different virtual reality display associated with a different virtual reality headset associated with the different user computing environment.

23. The virtual reality headset system of claim 22, wherein the data associated with or based on a social networking account is an entry or check in on a social networking page associated with the social networking account.

24. The virtual reality headset system of claim 22, wherein the first user computing environment is integrated in the first virtual reality headset.

25. The virtual reality headset system of claim 22, wherein the camera is disposed on or as part of the first virtual reality headset.

26. The virtual reality headset system of claim 22, wherein the common environment includes a backdrop or a background scene, and wherein the medium further comprises instructions for causing the first user computing environment to:

from the one or more network servers, receive and display an indicator of data associated with a second user computing environment, the second user computing environment associated with a second virtual reality headset having a second virtual reality display;

indicate that an invitation is to be sent to the second user computing environment, wherein a respective view of the common environment is caused to be displayed in the second virtual reality display if the invitation is accepted, and wherein the view of the common environment is displayed in the first virtual reality display at substantially the same time as the respective view of the common environment is displayed in the second virtual reality display; and receive input from a pointing device coupled to the first user computing environment, the received input allowing a user to point at and select a first asset displayed in the first virtual reality display or in the common environment displayed in the first virtual reality display, and based on the received input from the pointing device, cause a display of a teleport common environment associated with the first asset, the teleport common environment displayed in the first and second virtual reality displays, the teleport common environment having a different backdrop or background scene than the common environment; and wherein the first user computing environment is coupled to a camera, the camera imaging at least user hand position data, and wherein the instructions further cause the first user computing environment to use data from the camera to display an indication of virtual user hands in the first virtual reality display, in the second virtual reality display, in the common environment displayed in the first and second virtual reality displays, or in a combination of the above.

* * * * *